April 6, 1965     H. A. BURDWOOD     3,176,549
MACHINE FOR STRIPPING INSULATION FROM CABLES
Filed May 21, 1963     3 Sheets-Sheet 1
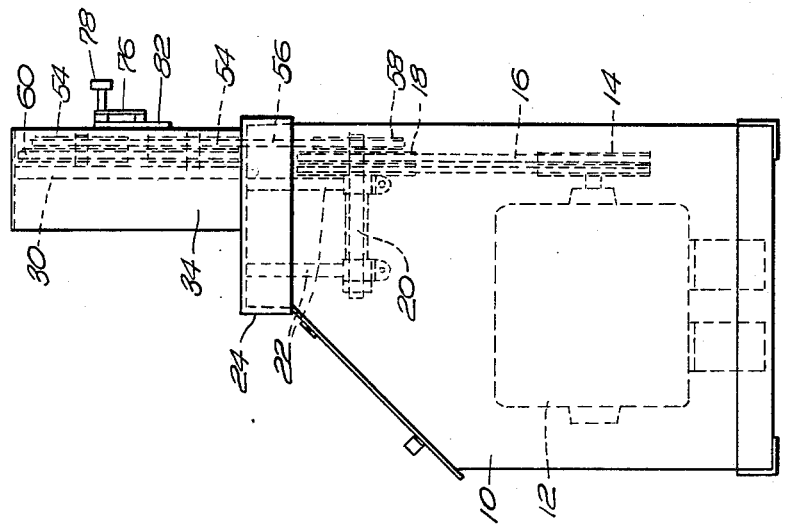
INVENTOR.
HOWARD A. BURDWOOD
BY
ATTORNEYS April 6, 1965  H. A. BURDWOOD  3,176,549
MACHINE FOR STRIPPING INSULATION FROM CABLES
Filed May 21, 1963  3 Sheets-Sheet 2

INVENTOR.
HOWARD A. BURDWOOD
BY Morse & Altman
ATTORNEYS

April 6, 1965 H. A. BURDWOOD 3,176,549
MACHINE FOR STRIPPING INSULATION FROM CABLES
Filed May 21, 1963 3 Sheets-Sheet 3

INVENTOR.
HOWARD A. BURDWOOD
BY Morse Altman
ATTORNEYS

United States Patent Office 3,176,549
Patented Apr. 6, 1965

3,176,549
MACHINE FOR STRIPPING INSULATION
FROM CABLES
Howard A. Burdwood, 1380 Westbrook St.,
Portland, Maine
Filed May 21, 1963, Ser. No. 281,876
7 Claims. (Cl. 81—9.51)

This invention relates to a machine for stripping insulation from electric cables, especially cables which are embedded in a covering of synthetic resin. Machines have been made to slit such coverings for removal but with certain types of insulation difficulties have been encountered in separating the strips of slitted insulation from the cable. It is an object of the present invention to loosen the insulation from the cable in the process of slitting it so that the insulation can easily be separated from the cable. As hereinafter explained, this requires four cutters uniformly spaced around the cable for simultaneous operation thereon. The cutters not only cut the insulation into four similar strips but also pinch the strips as they are formed to detach them from the cable at the point of cutting. This makes it easy to collect the strips of insulation which in some cases is valuable material, and also leaves the cable completely stripped.

For a more complete understanding of the invention, reference may be had to the following description thereof and to the drawings, of which—

FIGURE 1 is a front view of a complete machine embodying the invention;

FIGURE 2 is a side elevation of the same;

Figure 3:
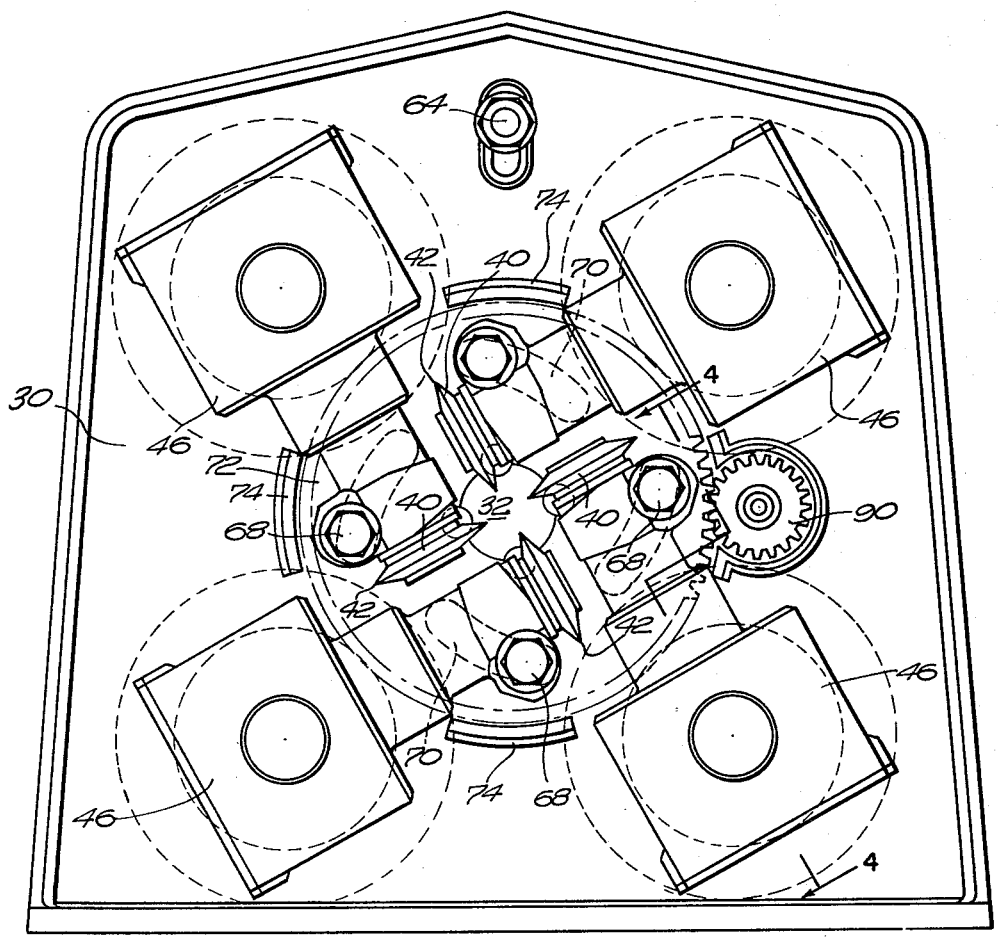
FIGURE 3 is a rear elevation, on a larger scale, of the head of the machine shown in FIGURES 1 and 2.
Figure 4:
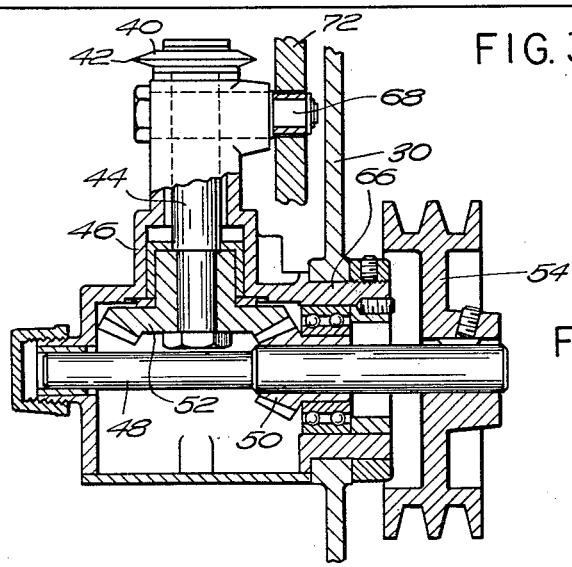
FIGURE 4 is a view, mostly in section on the line 4—4 of FIGURE 3, of one of the cutters and its drive.

A complete machine is indicated in FIGURES 1 and 2, comprising a lower housing 10 containing an electric motor 12 of sufficient power to turn a pulley 14 which is connected by a belt or belts 16 to a second pulley 18. This pulley is mounted on a shaft 20 supported by hangers 22 extending down from a substantial platform 24 which serves as a top for the housing 10 and as a base for the stripping mechanism driven by the motor 12. Secured on the platform 24 and rising vertically therefrom is a frame 30 which consists of a rigid plate having a central hole 32 therethrough and additional holes for shaft bearings as hereinafter described. The frame 30 and the mechanism mounted thereon are partially enclosed in an upper housing 34 which has a front wall with an aperture aligned with the hole 32 to receive a cable which is to be stripped.

Four cutters are symmetrically arranged about the hole 32. Each cutter consists of a circular disk knife 40 of substantial thickness, the peripheral margin of each disk being tapered in thickness to a sharp edge 42. Each knife 40 is mounted on the projecting end of a shaft 44 which is journalled in a casing 46 supported by the frame 30, the four shafts 44 being arranged with their axes in a common plane parallel to that of the frame 30. Also journalled in each casing 46 is a second shaft 48 which is at right angles to the corresponding shaft 44 and is operatively connected thereto by mitre gears 50, 52. The second shaft 48 projects from the casing 46 and through the frame 30, a double pulley wheel 54 being mounted on the projecting portion to drive the shaft 44 and hence the knife 40 associated therewith. There is a pulley wheel 54 for each of the four knives. These four pulley wheels 54 are driven by a belt 56 which, as indicated in FIGURE 1, passes around all of them and around a pulley wheel 58 mounted on the shaft 20. For uniformity of rotation, the four wheels 54 are also connected by a belt 60 which passes around them and also an idler 62 which rotates on a stud 64 (FIGURE 3) and is adjustable to take up slack in the belt 60 and maintain desired tension.

Figure 5:
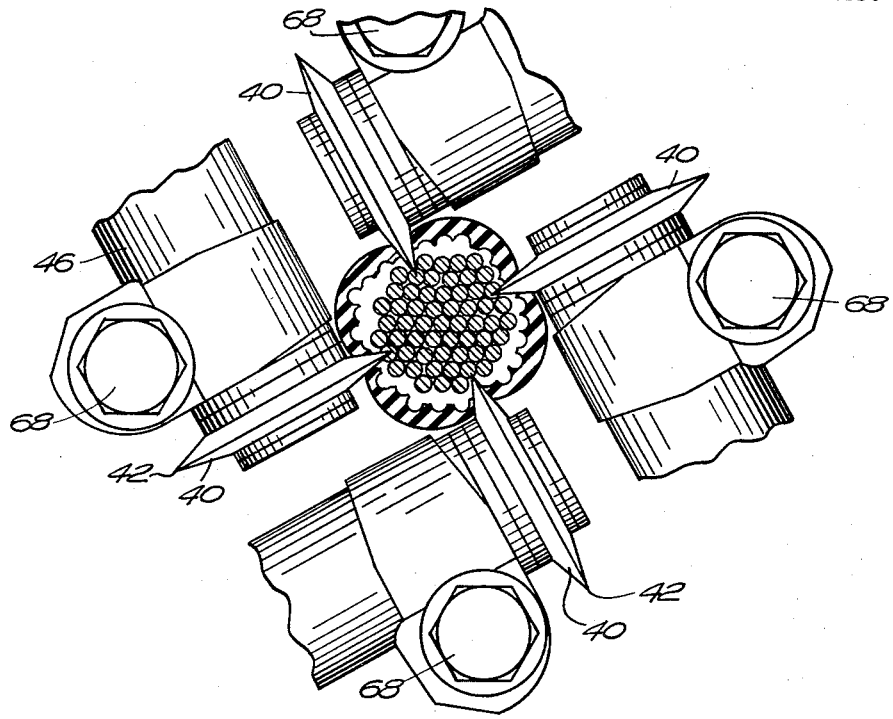
FIGURE 5 is a fragmentary elevational view, on a larger scale, of the cutters shown in FIGURE 3, operating on an insulated cable shown in section.

When the machine is in operation, the cable to be stripped is fed through the opening 32 as the knives 40 rotate. The knives cut into the insulation at four uniformly spaced points (FIGURE 5) and the knives by their thickness squeeze the strips of insulation so that they bulge away from the cable itself and are easily separated therefrom.

Figure 6:
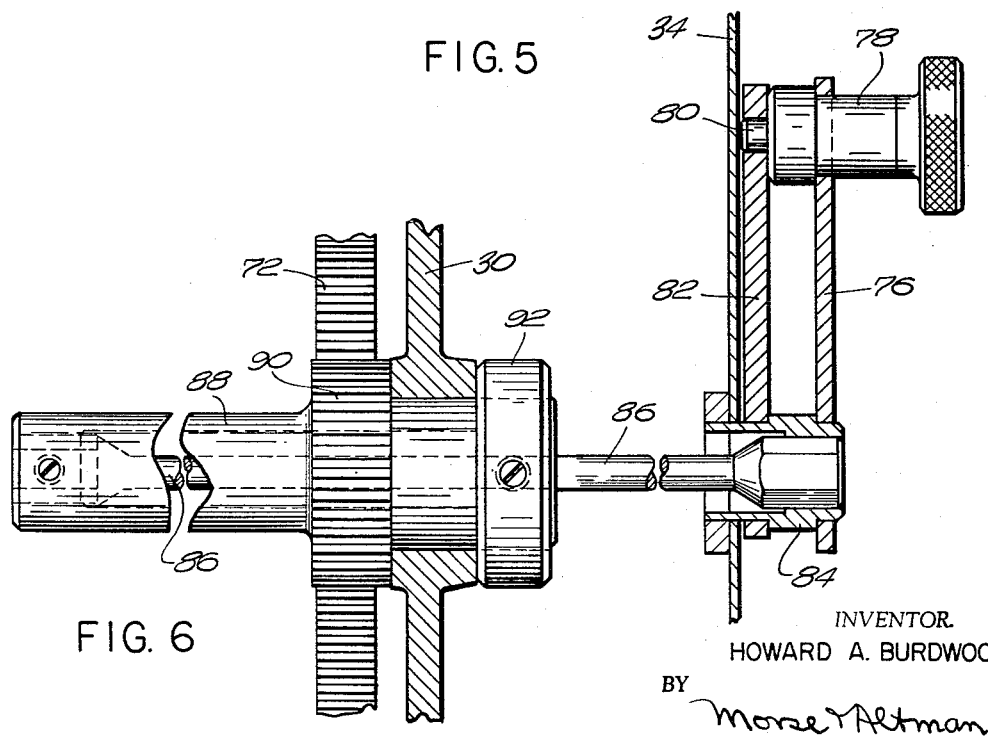
FIGURE 6 is a fragmentary elevation, partly in section, of the parts for adjusting the cutters to operate on different sizes of cables.

To adjust the machine to operate on cables of different diameters, the knives 40 are movable toward and from the axis of the hole 32. For this purpose the casing 46 of each knife has a cylindrical portion 66 which projects through a hole in the plate 30 and can be turned therein so as to move its knife 40 toward or from the axis of the hole 32. To control such turning movements and to hold the knives in adjusted position, each casing 46 has a cam follower 68 secured thereto, each said follower extending into a corresponding cam slot 70 in a disk 72 which has a central hole coaxial with the hole 32, arcute guide elements 74 being arranged around the periphery of the disk to keep it in place. The slots 70 are eccentric with respect to the periphery of the disk so that when the disk is turned, the followers 68 are cammed radially toward or from the center of the hole 32. To facilitate adjusting the knives, a crank 76 having a handle 78 is provided on the front of the machine. The handle 78 has a retractable pin 80 adapted to enter any one of a series of holes in a fixed plate 82 mounted on the wall of the housing 34 so as to lock the crank in any adjusted position. The crank 76 is mounted on a hub 84 which is connected by a torsion rod 86 to the remote end of a tubular shaft 88 which is journalled in the plate 30 (FIGURE 6). The shaft 88 is held in place by a pinion 90 mounted on or integral with the tubular shaft 88 and a collar 92, the pinion and collar being on opposite sides of the plate 80. The pinion 90 meshes with a few gear teeth in the periphery of the cam disk 72 so that when the crank 76 is operated, the disk 72 turns slightly and cams the knives toward or from the center of the hole 32. The row of holes in the plate 82 is calibrated so that the crank can be swung at once to the hole corresponding to the diameter of any cable the machine is capable of handling. The torsion rod 86 provides for yielding if the knives encounter a cable which is larger than the diameter for which the knives are adjusted. This is a safety factor to head off damage to the machine and provides the necessary spring action for clean cutting of stranded and out of shape sections of wire or cable and various sizes of work without too many changes of the size setting.

I claim:
1. Mechanism for stripping insulation from cables, comprising a base, a frame mounted in a vertical plane on said base, said frame having a central hole therethrough, four circular knives each consisting of a disk of substantial thickness having a margin tapering in thickness to a sharp edge symmetrically disposed about the center of said hole to revolve about axes in a common plane parallel to that of the frame, means on said frame for supporting and rotating said knives, and means on said frame operable to adjust said knives toward and from the center of said hole.

2. Mechanism as described in claim 1, said last named means consisting of means for adjustably moving all said knives in unison toward and from the center of said hole.

3. Mechanism as described in claim 1, said frame consisting of a rigid plate with additional holes for bearings.

4. Mechanism as described in claim 1, the supporting means for each knife comprising a gear casing secured to said frame, a short shaft journalled in the casing and projecting therefrom, the knife being mounted on the projecting portion of said shaft, a second shaft journalled in said casing at right angles to the first said shaft and projecting through said frame, a pulley wheel mounted on the projecting portion of said second shaft, and mitre gears within the casing operatively connecting said shafts.

5. Mechanism as described in claim 3, said knife adjusting means comprising a disk rotatively mounted parallel and adjacent to said frame and concentric with said hole, said disk having a central hole therethrough and four cam slots symmetrically arranged around said central hole, a cam follower mounted on each of said gear casings and engaging in a respective cam slot, and means supported by said frame for adjustively turning said disk about its center.

6. Mechanism as described in claim 4, said means for turning said disk comprising gear teeth on the periphery thereof, a pinion meshing with said teeth, a crank for turning said pinion, and torque transmitting means including a torsion rod connecting said crank and said pinion.

7. Mechanism as described in claim 5, said torque transmitting means comprising a tube journalled in said frame, said pinion being mounted on one end of said tube, said torsion rod being secured to the other end of the tube and extending through the tube to project out from said one end thereof, said crank being secured to the projecting end of said torsion rod.

References Cited by the Examiner
UNITED STATES PATENTS

| | | | |
|---|---|---|---|
| 923,426 | 6/09 | Gisriel. | |
| 1,656,755 | 1/28 | Palmer. | |
| 2,401,149 | 5/46 | Gordon | 81—9.51 |
| 2,873,489 | 2/59 | Hirschhorn | 81—9.51 X |
| 3,119,422 | 1/63 | Brown. | |

FOREIGN PATENTS

| | | |
|---|---|---|
| 152,887 | 6/04 | Germany. |

WILLIAM FELDMAN, *Primary Examiner.*